(12) United States Patent
Kwon et al.

(10) Patent No.: US 7,136,549 B2
(45) Date of Patent: Nov. 14, 2006

(54) APPARATUS FOR MODULATING SIGNAL BY USING DEFLECTOR INTEGRATED WITH DYNAMIC SINGLE MODE LASER DIODE

(75) Inventors: Oh-Kee Kwon, Gyeonggi-do (KR); Kang-Ho Kim, Daejon (KR); Kwang-Ryong Oh, Daejon (KR); Jonghoi Kim, Daejon (KR); Hyun-Soo Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 10/909,063

(22) Filed: Jul. 29, 2004

(65) Prior Publication Data

US 2005/0084197 A1    Apr. 21, 2005

(30) Foreign Application Priority Data

Oct. 15, 2003    (KR)    ........................ 10-2003-0071836

(51) Int. Cl.
    *G02B 6/42*    (2006.01)
(52) U.S. Cl. .......................................... 385/27; 385/15
(58) Field of Classification Search ................ 385/100, 385/115, 123
    See application file for complete search history.

(56) References Cited

U.S. PATENT DOCUMENTS 6,075,908 A * 6/2000 Paniccia et al. .............. 385/14
6,169,757 B1   1/2001 Merritt
6,480,641 B1 * 11/2002 Ding et al. .................. 385/14
6,810,047 B1 * 10/2004 Oh et al. ..................... 372/20

FOREIGN PATENT DOCUMENTS

| JP | 8-186330 | 7/1996 |
| JP | 2003-198056 | 7/2003 |
| JP | 2004-119459 | 4/2004 |
| KR | 2003-50986 | 6/2003 |

OTHER PUBLICATIONS

Journal of Lightwave Technology, vol. 13, No. 10, Oct. 1995, pp. 1948-1954.
IEEE Journal of Quantum Electronics, vol. 30, No. 11, Nov. 1994, pp. 2573-2577.
IEEE Journal of Quantum Electronics, vol. QE-21, No. 6, Jun. 1985, pp. 593-597.

* cited by examiner

*Primary Examiner*—Jennifer Doan
(74) *Attorney, Agent, or Firm*—Blakely Sokoloff Taylor & Zafman

(57) ABSTRACT

An optical modulator using a dynamic single mode laser diode (DSM-LD) integrated with a deflector is disclosed. The optical modulator for coupling a light beam to an optical fiber, the optical modulator includes: a laser diode for generating the light beam; and a deflector for deflecting a direction of the light beam according to an electric signal externally applied and outputting the defected light beam to the optical fiber, wherein the laser diode and the deflector are integrated with a multi-layer semiconductor structure in such a way that the light beam is modulated by changing a defection angle of the deflector.

11 Claims, 5 Drawing Sheets

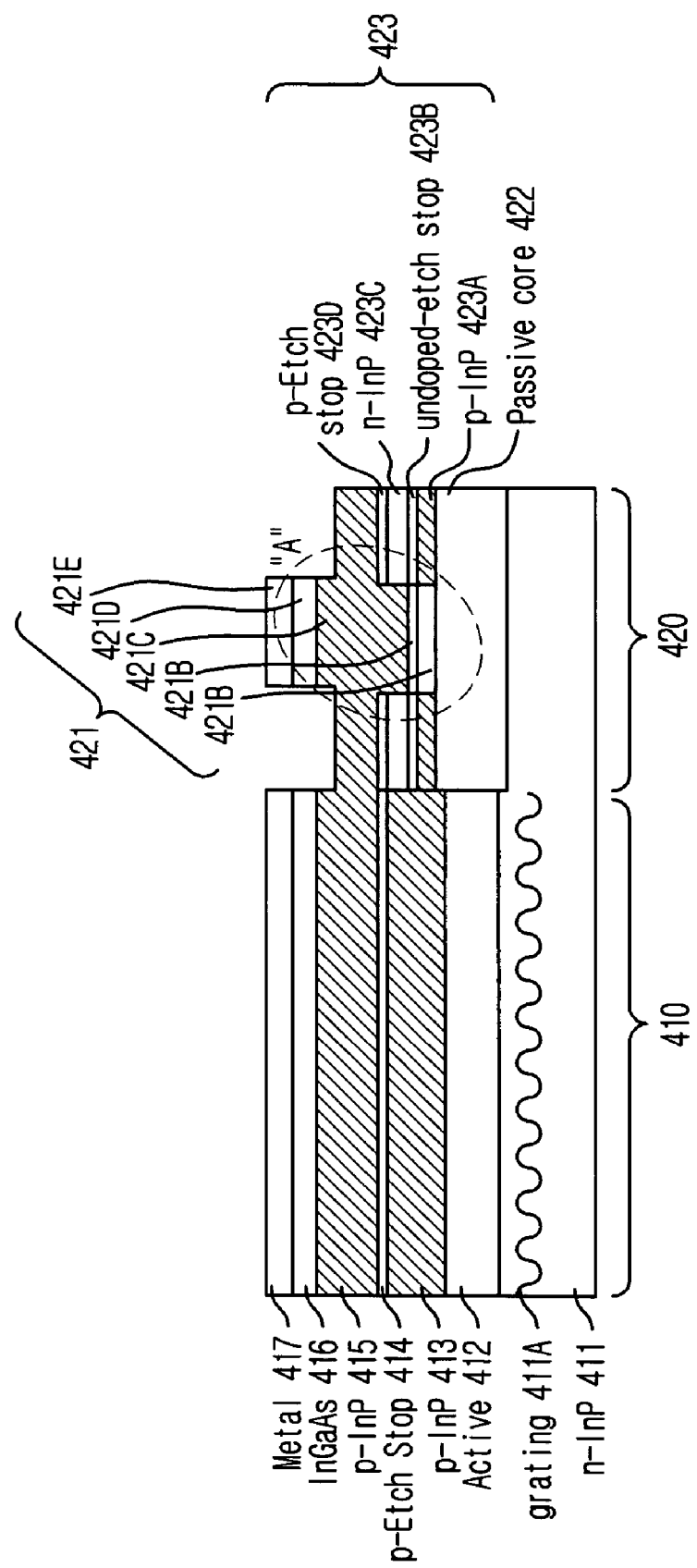

APPARATUS FOR MODULATING SIGNAL BY USING DEFLECTOR INTEGRATED WITH DYNAMIC SINGLE MODE LASER DIODE

FIELD OF THE INVENTION

The present invention relates to a modulator for an optical communication system; and, more particularly, to an optical modulator for modulating a signal by using a deflector integrated with a dynamic single mode laser diode (DSM-LD).

DESCRIPTION OF RELATED ARTS

Recently, various analog and digital optical communication systems have been introduced for processing mess traffic amount of information and providing various communication services to users. An early stage, a time division multiplex (TDM) method is used for transmitting data in optical communication systems. In order to transmit mess amount of data in a short period time, a wavelength division multiplex (WDM) method is introduced. The WDM method transmits mess amount of data by dividing a wavelength of an optical signal and using divided wavelengths of the optical signal. The WDM method was further developed to a dense wavelength division multiplex (DWDM) method that densely divides the wavelength of the optical signal and uses the densely divided wavelength for transmitting data. The DWDM method transmits data in a speed of tera bits per second (Tbps).

The Fabry Perot—laser diode (FP-LD), characterized by its wide optical gain spectrum and multimode operation, has limited used in the application of an optical communication system with the DWDM method. On the other hand, a single mode operation becomes feasible by introducing a period corrugation along the propagation path. This periodic corrugation, namely grating, backscatters all waves propagating along one direction and finally acts as an optical band-pass filter so that only wavelength components close to the Bragg wavelength will be coherently reinforced. Other wavelength terms are effectively cut off as a result of destructive interference.

The laser diodes with the grating are classified into distributed feedback—laser diode (DFB-LD), a distributed Bragg reflector—laser diode (DBR-LD) and a distributed reflector—laser diode (DR-LD). These types of laser diodes have been widely used as a semiconductor optical source in coherent optical communication systems as well as DWDM systems because they can be operated as a single mode even in a direct modulation (DM). Especially, the DFB-LD has been widely used owing to easy fabrication, high reliability, and high power.

The DFB-LD includes a resonance structure provided with a grating and an active layer formed near the grating in a semiconductor material. The DFB-LD is a resonator having a predetermined length "L". The DFB-LD generates an optical gain at a medium of the active layer by an electric current injected from external, the optical gain is amplified in the resonance structure and finally, the DFB-LD generates a coherent light beam owing to the grating. The light beam is transferred to an optical fiber and transmitted through the optical fiber.

In a direct modulation (DM), the DFB-LD generates the light beam according to a bit stream such as "1010". That is, the DFB-LD generates the light beam by receiving the electric current when corresponding bit of the bit stream is "1" and outputs the light beam to the optical fiber. In contrary, the electric current is not applied to the DFB-LD when corresponding bit of the bit stream is "0" so the DFB-LD does not generate the light beam.

In the DM, the DSM-LD generates a chirp which is a phenomenon that a wavelength of the light beam is fluctuated by the modulation of electric current. This is due to the variation in the refractive index of a medium and results in broadening a spectral line-width of the light beam. This chirped bit stream is broadened and distorted while it travels through the nonlinear dispersive media such as optical fiber. Therefore, it is difficult to apply to DWDM system where the wavelength of light beam is divided less than 0.8 nm (100 GHz).

For overcoming the above mentioned disadvantage of the DM cause by the chirp, an indirect modulation is introduced. The indirect modulation uses an external modulator to modulate a signal.

In the indirect modulation, the DFB-LD continuously generates a light beam and outputs the generated light beam to the external modulator. The external modulator passes or un-passes (ON-OFF) the light beam to an optical fiber according to an external electric signal. Since the DFB-LD is not operated for modulation, there is no variation of injection current for changing the refractive index of the medium and thus, the chirp can be fundamentally eliminated.

Recently, an optical modulator for the indirect modulation is implemented by using an electro-absorption (EA) type modulator or a Mach-Zehnder type modulator as the external modulator integrated with the DSM-LD in a monolithic type and a hybrid type.

FIG. 1 is a diagram showing a conventional optical modulator integrated with a Mach-Zehnder type modulator.

As shown, the conventional optical modulator 100 includes a DFB-LD 110 and a Mach-Zehnder type modulator 120.

The DFB-LD 110 continuously generates a light beam and outputs the light beam to the Mach-Zehnder type modulator 120.

The Mach-Zehnder type modulator 120 passes or un-passes (ON-OFF) the light beam to the optical fiber (not shown) by applying an electric current or a voltage to arms 121A and 121B. In a case of using one arm 121A, either the electric current or the voltage can be applied and in a case of using two arms 121A and 121B, which is called a push-pull method, the voltage is applied for changing a phase of light beam propagated through the arms 121A and 121B. That is, the light beam is divided to a two light beams and divided light beams are propagated through two arms 121A and 121B. Each of the light beams is controlled to change it's phase according to the electric current or the voltage applied to the arms 121A and 121B. The electric current or the voltage is applied to the electrodes 123A, 123B to generate an optical field. The optical field changed a phase of the light beams propagated through the two arms 121A and 121B. The phase changed light beams are combined at an output end of the Mach-Zehnder modulator 120. The light beams propagated through the two arms are passed to the optical fiber (not shown) through an anti-reflection coating 122 by a constructive interference of two phase changed light beams or un-passed to the optical fiber (not shown) by a deconstructive interference.

The conventional optical modulator 100 reduces an amount of chirp comparing to the DM. In the case of the push-pull method, negative chirp may be generated and thus, a transmission characteristic can be improved. Furthermore, an extinction ration (ER) can be improved. However, a length of both arms 121A and 121B must be longer than a predetermined length for sufficient phase modulation. Therefore, there is a limitation of maximum modulation speed because of parasitic capacitances, a manufacturing conventional optical modulator 100 becomes complicated and a size of the optical modulator becomes larger. Moreover, the phase of the light beam is distorted by a refractive index at an output end of the Mach-Zehnder modulator 120.

FIG. 2 is a diagram illustrating a conventional optical modulator integrated with an electro-absorption (EA) type modulator.

As shown, the conventional optical modulator 200 includes a DFB-LD 210 and an electro-absorption (EA) type modulator 220.

The DFB-LD 210 continuously generates a light beam by using a resonance effect in an active layer 211 and outputs the light beam to the electro-absorption (EA) type modulator 220.

The electro-absorption (EA) type modulator 220 passes or un-passes (ON-OFF) the light beam to the optical fiber (not shown) by absorbing the light beam in a waveguide medium 221 having a quantum well structure based on a quantum confined stark effect (QCSE). A reverse voltage is applied to the waveguide medium 221 of the EA type modulator 220 and an electric field is excited at the waveguide medium 221. The electric field occurs the QCSE to absorb the light beam inputted to the waveguide medium 221. The QCSE is a phenomenon that an absorption spectrum in quantum wells is shifted to the longer wavelength by an electric filed.

A Stark effect, a Frantz Keldysh effect or an exaction quenching may be used for absorbing the light beam.

In the electro-absorption (EA) type modulator 220, the absorption spectrum of the excition must be sharp and a wavelength of absorption peak must be very close to a wavelength of the light beam for obtaining high extinction ratio and high optical absorption within less voltage. However, when the wavelength of absorption spectrum is closed to the wavelength of the light beam, an optical output of the electro-absorption modulator is very weak caused by a no-bias absorption, which absorbs the light beam when an electric field is not applied. Accordingly, a design of the electro-absorption modulator is very complicated for obtaining high extinction ratio and high optical absorption within less voltage since a relation between a wavelength of the light beam generated from the DFB-LD and a wavelength of peak absorption spectrum is must be considered to reduce the basic absorption.

Furthermore, the extinction ratio more than 20 dB cannot be obtained in the electro-absorption modulator having the quantum well structure since a Hole Pile-up is occurred in proportion to a modulation speed. That is, heavy holes are accumulated in the quantum well in proportion to the modulation speed is getting fast.

SUMMARY OF THE INVENTION

It is, therefore, an object of the present invention to provide a modulator including a dynamic single mode laser diode integrated with a deflector for modulating a signal by changing a direction of a light beam oscillated from the dynamic single mode laser diode by using the deflector to thereby control a coupling efficiency between the deflector and an optical fiber.

It is another object of the present invention to provide a modulator by using a dynamic single mode laser diode integrated with a deflector for eliminating a chirp generated by a direct modulation and having a high extinction ratio.

It is still another object of the present invention to provide a modulator by using a dynamic single mode laser diode integrated with a deflector for eliminating a chirp generated by a reflectivity of an output end of the deflector.

It is further still another object of the present invention to provide a small and simple structured modulator by using a dynamic single mode laser diode integrated with a deflector.

In accordance with an aspect of the present invention, there is provided an optical modulator for coupling a light beam to an optical fiber, the optical modulator including: a laser diode for generating the light beam; and a deflector for deflecting a direction of the light beam according to an electric signal externally applied and outputting the defected light beam to the optical fiber, wherein the laser diode and the deflector are integrated with a multi-layer semiconductor structure in such a way that the light beam is modulated by changing a deflection angle of the deflector

BRIEF DESCRIPTION OF THE DRAWINGS

The above and other objects and features of the present invention will become better understood with regard to the following description of the preferred embodiments given in conjunction with the accompanying drawings, in which:

FIG. 4B is a side elevation view of the optical modulator, which is a cross sectional view taken along with a line II–II' of the optical modulator in FIG. 4A;

DETAILED DESCRIPTION OF THE INVENTION

Hereinafter, an optical modulator for modulating a signal by using a deflector integrated with a dynamic single mode laser diode (DSM-LD) in accordance with a preferred embodiment of the present invention will be described in detail with reference to the accompanying drawings.

Figure 1:
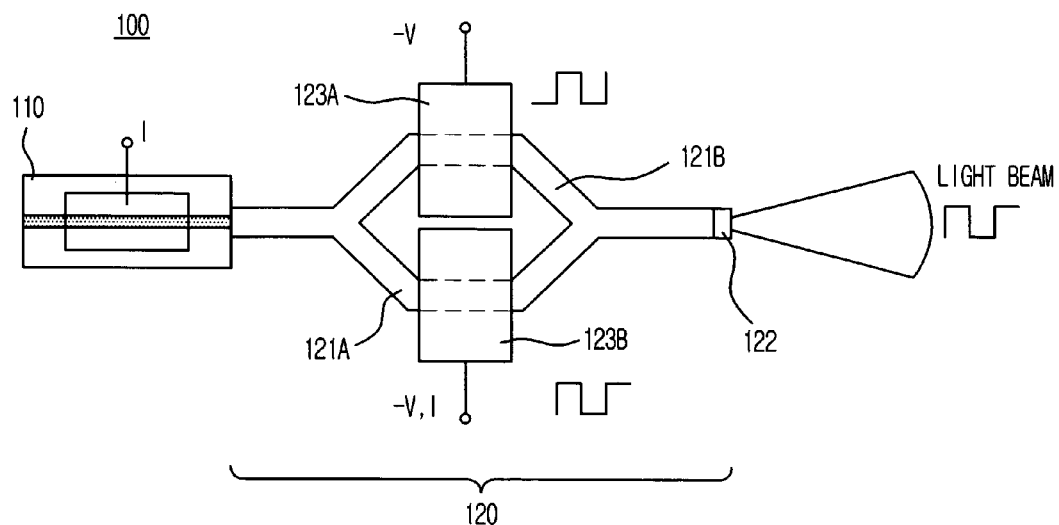
FIG. 1 is a diagram showing a conventional Mach-Zehnder semiconductor optical modulator integrated with a Mach-Zehnder type modulator in accordance with a prior art.
Figure 2:
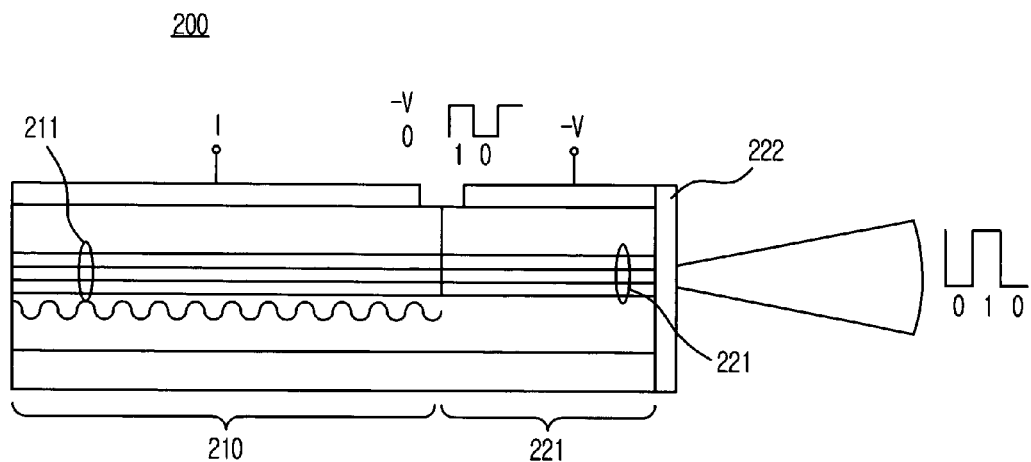
FIG. 2 is a diagram illustrating a conventional electro-absorption semiconductor optical modulator 200 integrated with an electro-absorption (EA) type modulator.
Figure 3A:
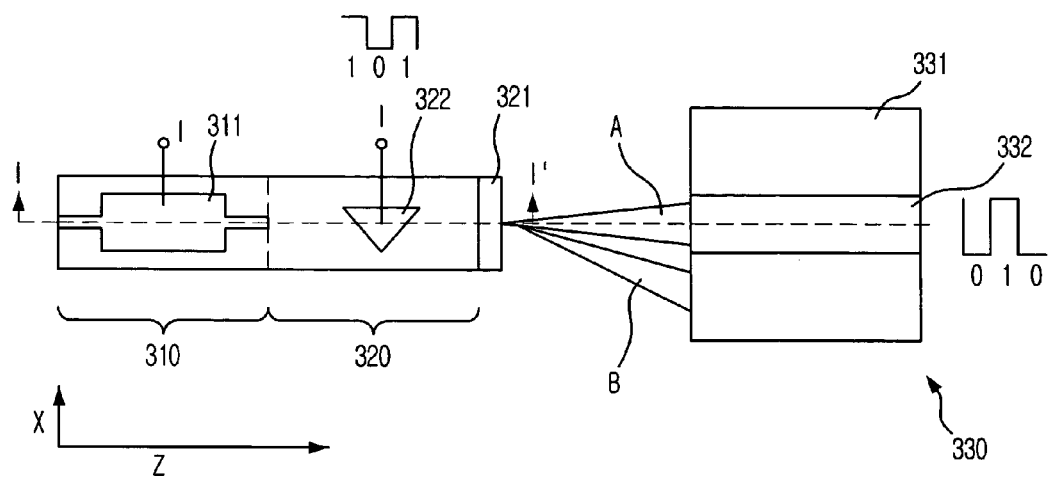
FIGS. 3A and 3B are a top view and a side elevation view of an optical modulator in accordance with a preferred embodiment of the present invention.
Figure 3B:
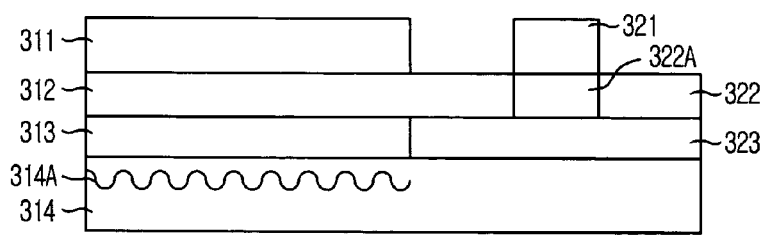

FIG. 3A is a top view of an optical modulator in accordance with a preferred embodiment of the present invention and FIG. 3B is a side elevation view of the optical modulator, which is a cross sectional view taken along with I–I' of the optical modulator in FIG. 3A.

As shown, the optical modulator 300 includes a DFB-LD 310 and a deflector 320 integrated in a multi-layer semiconductor material and the optical modulator 300 is coupled to an optical fiber 330.

The DFB-LD 310 includes an n-InP layer 314 having a grating 314A, an active layer 313 formed on the n-InP layer for generating a light beam, a P-clad layer 312 formed on the active layer and an electrode 311 formed on the P-clad layer 312 for applying an electric current to the active layer for generating the light beam, wherein the electrode 311 is a metal layer. The DFB-LD 310 continuously generates the light beam and outputs the light beam through the active layer 313 to the deflector 320.

The deflector 320 includes a passive core 323 coupled to the active layer 313 of the DFB-LD 310 for receiving the light beam from the DFB-LD 310 and passing the light beam to the optical fiber 330, a pattern layer 322 including a deflection pattern 322A for changing a refractive index of the passive core 323 and an electrode 321 for applying the electric current to the deflection pattern 322A.

The deflector 320 receives the light beam from the DFB-LD 310 and deflects a direction of the light beam propagated through the passive waveguide 323 according to the electric current applied to the deflection pattern 322A. By changing the direction of the light beam, an optical coupling efficiency between the optical modulator 300 and the optical fiber 330 is controlled for modulation.

In a case that the electric current is not applied to the deflection pattern 322A of the deflector 320, the deflector 320 passes the light beam to the optical fiber 330 without deflecting the direction of the light beam and thus, the light beam is transmitted to the optical fiber 330. The light beam is passed through a path A to a core 332 of the optical fiber 330.

In a case that the electric current is applied to the deflection pattern 322A of the deflector 320, the deflector 320 deflects the direction of the light beam to propagate to the clad 331 of the optical fiber 330. That is, a direction of the light beam is changed to a path B by the deflector 320 and the light beam is propagated toward to a clad 331 of the optical fiber 330. Therefore, the light beam is not passed to the fiber core 332. That is, the deflector 320 reduces the optical coupling efficiency of the light beam to the optical fiber.

The direction of the light beam is deflected by the deflection pattern 322A. The electric current is applied to the deflection pattern 322A through the electrode 321 and the deflection pattern 322A changes the refractive index of a medium of the passive core 323.

The electric current applied to the deflect pattern changes a refractive index and a medium loss of the passive waveguide because a complex dielectric constant of the medium is influenced by the electric current. As increasing amount of electric current applied to the medium, a band-gap shrinkage, a free-carrier absorption and a plasma effect are additionally occurred with the anomalous dispersion and they also change the refractive index of the medium of the passive waveguide. Therefore, the refractive index of the medium is varied according to the amount of the electric current applied to the medium.

The deflection pattern 322A has a shape of a triangle, which is asymmetric shape based on a Z-axis in FIG. 3A. By the shape of the deflection pattern 322A, the amount of the electric current applied to the medium of the pass waveguide 322 is varied. That is, the refractive index of the medium of the pass waveguide 322 is changed according to the amount of the electric current varied by the shape of the deflection pattern 322A. A vertex portion of the deflection pattern applies less amount of the electric current comparing to a base portion of the deflection pattern. The refractive index of the medium coupled to the vertex portion of the deflection pattern 322A is less influenced than the medium coupled to the base portion of the deflection pattern 322A. Therefore, the light beam is deflected to a direction from the base of the deflection pattern 322A to the vertex of the deflection patterns 322.

In the preferred embodiment of the present invention, the deflection pattern 322A of the triangle shape having N-P semiconductor structure and the pattern layer 322 has P-N semiconductor structure. Therefore, the electric current applied to the deflection pattern 322 does not flow to the pattern layer 322.

In the preferred embodiment of the present invention, a medium of InGaAsP is used as the medium of the passive waveguide 323. The refractive index of the medium at a specific wavelength can be varied according to a loss spectrum of the medium. In a case of an InGaAsP medium having 1.3 µm of band-gap wavelength, a difference of the refractive index varied is 0.06 at a wavelength of 1.55 µm.

In the preferred embodiment of the present invention, the electric current is used for changing the refractive index of the medium but an electric voltage can be used for the same.

The DFB-LD 310 and the deflector 320 are integrated in a multi-layer semiconductor material within a monolithic type or a hybrid type. The deflection pattern 322A of the deflector 320 must be an asymmetric shape base on a Z-axis, which is a direction of propagation of the light beam.

Figure 4A:
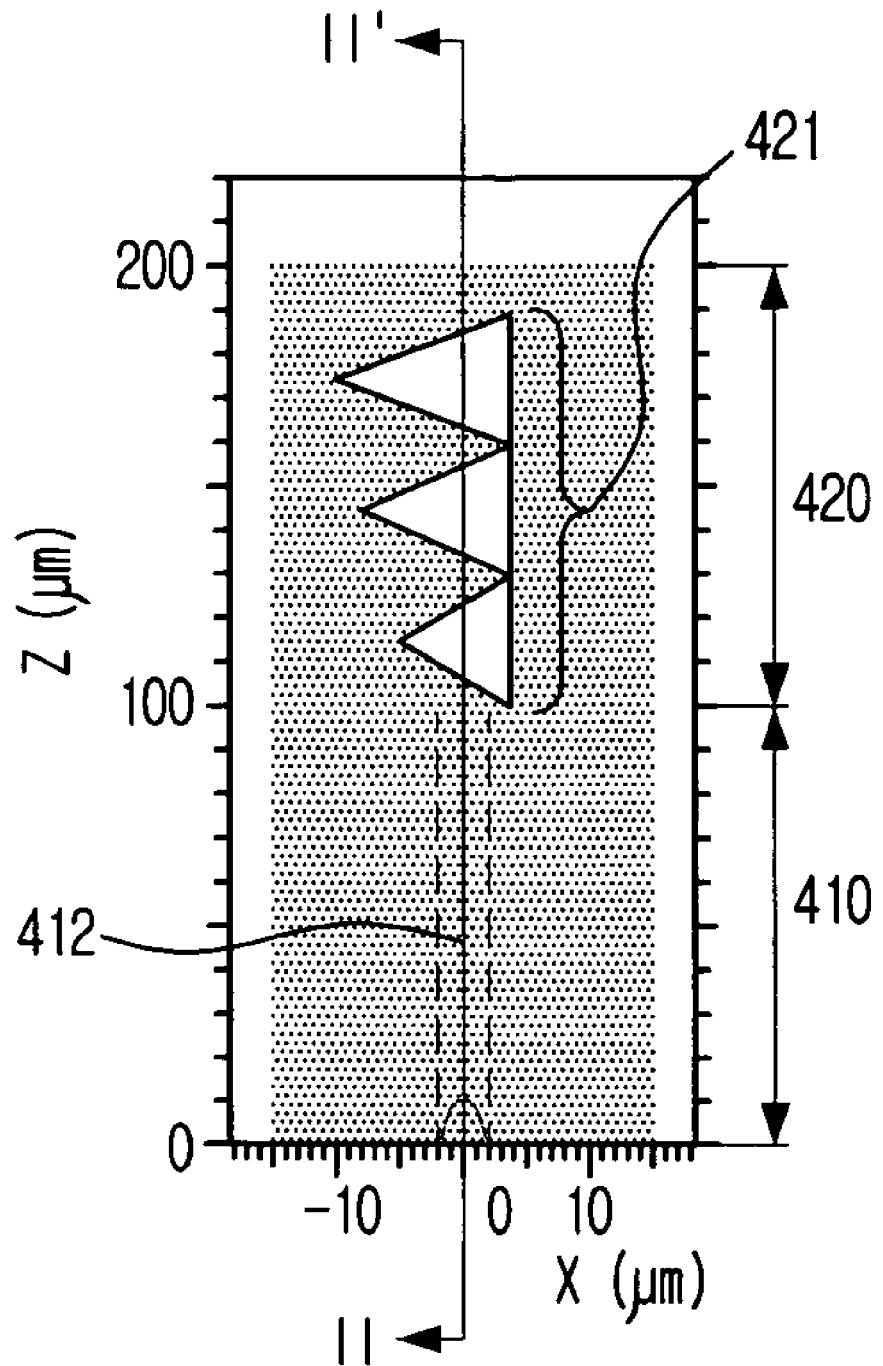
FIG. 4A is a top view of an optical modulator in accordance with another preferred embodiment of the present invention.

FIG. 4A is a top view of an optical modulator in accordance with another preferred embodiment of the present invention and FIG. 4B is a side elevation view of the optical modulator, which is a cross sectional view taken along with a line II–II' of the optical modulator in FIG. 4A.

As shown in FIG. 4A, the optical modulator 400 including a DFB-LD 410 and a deflector 420 integrated in a multi-layer semiconductor material. The deflector 420 includes a deflection pattern 421 having three triangle shapes for minutely controlling a deflection of a light beam.

In the preferred embodiment of the present invention in FIG. 4A, a length of the optical modulator 400 is 100 µm. A width of active layer 412 of the DFB-LD 410 is 3 µm and a refractive index of the active layer 412 is "3.33". A refractive index of a P-clad of the DFB-LD 410 is "3.30" and a refractive index of the deflector 420 is "3.24".

Lengths of three triangle shapes in the deflection patterns 421 are 10 µm, 12.5 µm, and 15 µm and heights are 15 µm respectively.

According to the structure of the optical modulator 400 in FIG. 4A, a variation of the refractive index of the deflector 420 is 0.06.

The DFB-LD 410 has a laterally weakly index guide structure and the deflector 410 has a slab waveguide structure in the preferred embodiment in FIG. 4A. In the structure of the optical modulator 400 in FIG. 4A, a width of the light beam outputted from the DFB-LD 410 may become wider. The DFB-LD 410 can be implemented to have a buried hetero-structure such as a strong index guide structure. In this case, the width of the light beam may become much wider because widths of a waveguide and a mode are very narrow. For preventing spreading the width of the light beam, an optical spot size converter may be inserted between the DFB-LD 410 and the deflector 420.

As shown in FIG. 4B, the DFB-LD 410 includes an n-InP layer 411 including a grating, an active layer 412 formed on the n-InP layer 411, a p-InP layer 413 formed on the active layer 412, a p-Etch stop layer 414 formed on the p-InP layer 413, a p-InP layer 415 formed on the p-Etch stop layer 414, an InGaAsP layer 416 formed on the p-InP layer 415 and a metal layer 417 formed on the InGaAsP layer 416 as an electrode. The deflector 420 includes the n-InP layer 411 which is extended from the DFB-LD 410, a passive core 422 formed on the n-InP layer 411 and a pattern layer 423 having a p-InP layer 423A, an undoped-Etch stop layer 423B, a n-InP 423C and a P-Etch step layer 423D formed in order. The pattern layer 423 includes the deflection pattern 421 formed on a portion A of the pattern layer 423. The deflection pattern 421 includes an n-InP layer 421A, a p-Etch stop layer 421B, a P-InP layer 421C, an InGaAsP layer 421D and a metal layer 421E. As shown, the deflection pattern 421 has an N-P semiconductor structure and the pattern layer 423 has a P-N semiconductor structure. Therefore, electric current flowing in the deflection pattern 421 is not flow to the pattern layer 423.

Figure 5:
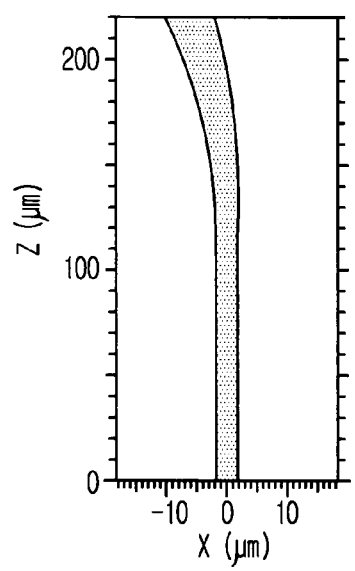
FIG. 5 is a graph showing a beam propagation characteristic of the optical modulator in FIG. 4A.

FIG. 5 is a graph showing a beam propagation characteristic of the optical modulator in FIG. 4A.

As shown, at a point of 200 μm on a Z axis, the graph clearly shows that the light beam is maximally deflected to approximately 6.3 μm based on an X axis. That is, a maximum angle of deflection is 22 degrees.

Figure 6:
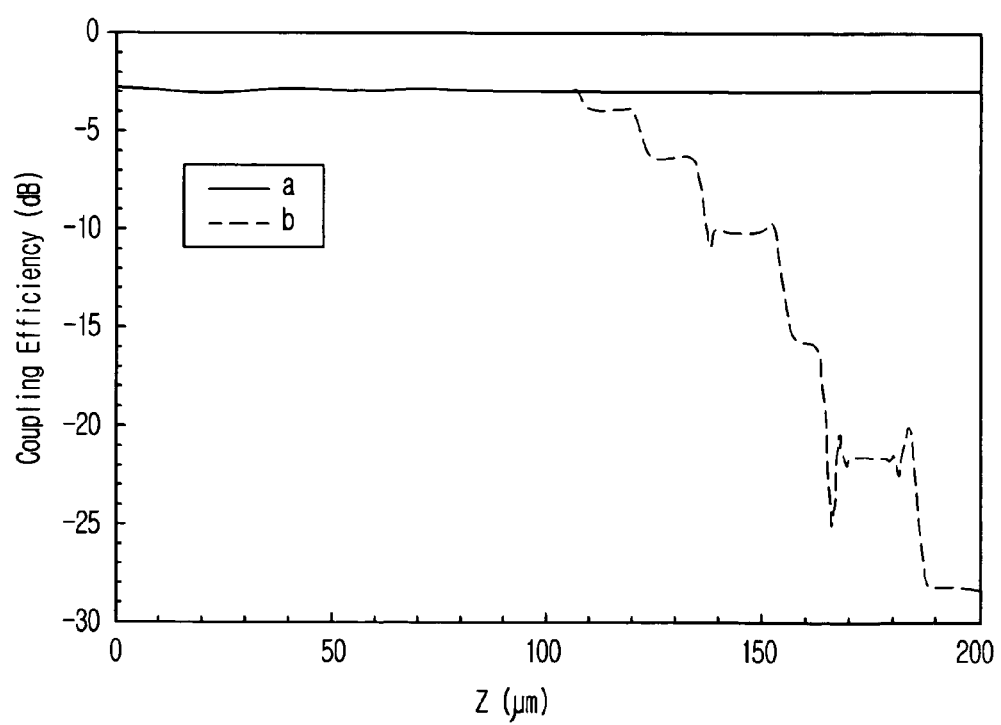
FIG. 6 is a graph showing a coupling efficiency between the optical modulator 400 in FIG. 4A and an optical fiber.

FIG. 6 is a graph showing a coupling efficiency between the optical modulator 400 in FIG. 4A and an optical fiber. The optical fiber includes a 9 μm diameter core and a 125 μm diameter clad. A difference of refractive indexes between the core and the clad is 0.01.

A solid curve a represents the coupling efficiency when a refractive index of the deflector 420 is not changed and a dotted curve b represents the coupling efficiency when a refractive index of the deflector 420 is changed by applying an electric current to the deflector 420. The curves a and b shows coupling efficiency based on a lateral direction of deflection of the light beam and thus, the coupling efficiency may be decreased if a vertical direction of deflection of the light beam is considered.

The graph shows that the coupling efficiency between the optical modulator 400 and the optical fiber is approximately −3 dB when the refractive index of the deflector 400 is not changed.

In a case that the refractive index is not changed, the light beam is spread when the light beam travels through the slab waveguide of the deflector 420. However, the coupling efficiency is maintained at approximately −3 dB since a width of a waveguide mode of the optical fiber is much wider than a width of optical distribution in the slab waveguide.

In contrary, the coupling efficiency is incredibly decreased when the refractive index of the deflector 420 is changed by applying the electric current to the three triangle patterns of the deflector 420. The coupling efficiency is gradually deflected when the light beam is passed through each of three triangle shaped deflection patterns of the deflector 420.

At an output end of the deflector 420, the coupling efficiency is approximately −28 dB and an extinction ratio is approximately 25 dB, which is calculated by 10 log(power_on/power_off). If a loss, which is increased according to an amount of the electric current applied to the deflector 420, is considered, the expected extinction ratio would be increased.

As mentioned above, the optical modulator using a deflector in accordance with the present invention can control a coupling efficiency by deflecting the light beam.

Also, the optical modulator using the deflector can eliminate the chirp generated by direct modulation method by using the deflector for changing a direction of light beam oscillated from a laser diode.

Furthermore, the optical modulator using the deflector can be manufactured in small sized and simple structure comparing to a conventional Mach-Zehnder optical modulator. The optical modulator is less influenced by reflection caused by the external electric signal modulation because a variation of amplitude of light beam propagated through the deflector according to external electric signal is much smaller than the electro-absorption modulator. Accordingly, manufacturing of the deflector is much easier since the deflector of the present does not require extremely low reflectivity such as below than 0.01%.

Moreover, the optical modulator having the deflector has higher extinction ratio and a lower refractive rate comparing to a conventional electric absorption optical modulator.

The present invention can produce less amount of chirp since amplitude of a laser beam generated from a light source is not changed when a deflector is turned-on and off for changing a direction of the laser beam. That is, an amount of a laser beam reflected from the deflector to the light source is almost same.

The present application contains subject matter related to Korean patent application No. KR 2003-0071839, filed in the Korean patent office on Oct. 15, 2003, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. An optical modulator for coupling a light beam to an optical fiber, comprising:
    a laser diode for generating the light beam; and
    a deflector for deflecting a direction of the light beam according to an electric signal externally applied and outputting the defected light beam to the optical fiber,
    wherein the laser diode and the deflector are integrated with a multi-layer semiconductor structure in such a way that the light beam is modulated by changing a deflection angle of the deflector.

2. The optical modulator of the claim 1, further includes a spot size converter between the laser diode and the deflector.

3. The optical modulator of the claim 1, wherein the laser diode is a dynamic single mode laser diode such as a distributed feed back laser diode.

4. The optical modulator of the claim 1, wherein the deflector includes a passive waveguide layer and a pattern layer formed on the passive waveguide layer having an asymmetric pattern on a predetermined portion of the pattern layer.

5. The optical modulator of the claim 4, wherein the asymmetric pattern changes a refractive index of the passive waveguide layer in the deflector by receiving the electric signal in order to deflect a direction of the light beam propagated through the passive waveguide layer.

6. The optical modulator of claim 5, wherein the asymmetric pattern is an asymmetrical shape which is asymmetrical in a direction of propagation of the light beam.

7. The optical modulator of claim 4, wherein the asymmetric pattern has an N-P semiconductor structure and the pattern layer has a P-N semiconductor structure.

8. The optical modulator of claim 4, wherein the deflector has a slab waveguide structure and an antireflection coating layer formed at an output end of the deflector.

9. The optical modulator of claim 4, wherein the deflector has a Ridge waveguide structure and an antireflection coating layer formed at an output end of the deflector.

10. The optical modulator of claim 1, wherein the multi-layer semiconductor structure is a single type.

11. The optical modulator of claim 1, wherein the multi-layer semiconductor structure is a hybrid type.

* * * * *